United States Patent
Rana et al.

(10) Patent No.: US 9,369,419 B2
(45) Date of Patent: Jun. 14, 2016

(54) METHOD AND AN APPARATUS IN A COMMUNICATION NODE FOR IDENTIFYING RECEIVERS OF A MESSAGE

(75) Inventors: Juwel Rana, Luleå (SE); Johan Kristiansson, Luleå (SE); Kåre Synnes, Gammelstad (SE); Stefan Håkansson, Luleå (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 76 days.

(21) Appl. No.: 14/361,130

(22) PCT Filed: Nov. 30, 2011

(86) PCT No.: PCT/SE2011/051457
§ 371 (c)(1),
(2), (4) Date: May 28, 2014

(87) PCT Pub. No.: WO2013/081513
PCT Pub. Date: Jun. 6, 2013

(65) Prior Publication Data
US 2014/0304350 A1    Oct. 9, 2014

(51) Int. Cl.
G06F 15/16    (2006.01)
H04L 12/58    (2006.01)
G06Q 50/00    (2012.01)
G06Q 10/10    (2012.01)
H04W 4/06    (2009.01)
H04W 4/02    (2009.01)

(52) U.S. Cl.
CPC ............ H04L 51/22 (2013.01); G06Q 10/107 (2013.01); G06Q 50/01 (2013.01); H04W 4/02 (2013.01); H04W 4/06 (2013.01)

(58) Field of Classification Search
CPC ...... H04L 51/22; H04L 12/58; G06Q 10/107; G06Q 50/01; H04W 4/06; H04W 4/02
USPC ......................................... 709/204, 206, 207
See application file for complete search history.

(56) References Cited

U.S. PATENT DOCUMENTS 8,346,864 B1 *  1/2013  Amidon ............... H04L 65/1069
                                                   709/204
2007/0290787 A1  12/2007  Fiatal et al.
(Continued)

FOREIGN PATENT DOCUMENTS

CN            102025657 A      4/2011

OTHER PUBLICATIONS

International Search Report for PCT Application No. PCT/SE2011/051457 mailed Nov. 8, 2012, 5 pages.
(Continued)

*Primary Examiner* — Cheikh Ndiaye
(74) *Attorney, Agent, or Firm* — Patent Portfolio Builders, PLLC (57) ABSTRACT

The present invention relates to a method and an arrangement in a communication node for creating a group of contacts to receive a message from a user of a user device. The method includes receiving a tag indicating conditions for the message, and obtaining characteristics of primary contacts of the user. Primary contacts are selected for receiving the message by matching the conditions of the tag with the characteristics of the primary contacts, and primary contacts are selected which have characteristics that match the conditions of the tag. A group including the selected primary contacts is initiated.

17 Claims, 5 Drawing Sheets

(56) References Cited

U.S. PATENT DOCUMENTS

| | | |
|---|---|---|
| 2009/0215486 A1 | 8/2009 | Batni et al. |
| 2009/0319288 A1 | 12/2009 | Slaney et al. |
| 2010/0241713 A1* | 9/2010 | Shimizu .............. G06Q 50/00 709/206 |
| 2010/0312596 A1* | 12/2010 | Saffari .............. G06Q 30/0203 705/7.32 |
| 2011/0153740 A1 | 6/2011 | Smith et al. |
| 2011/0213785 A1 | 9/2011 | Kristiansson et al. |
| 2012/0102130 A1* | 4/2012 | Guyot .................. H04L 51/12 709/206 |
| 2013/0282839 A1* | 10/2013 | Alcala .................. G06Q 50/01 709/206 |

OTHER PUBLICATIONS

Written Opinion of the International Searching Authority for PCT Application No. PCT/SE2011/051457 mailed Nov. 8, 2012, 7 pages.

* cited by examiner

METHOD AND AN APPARATUS IN A COMMUNICATION NODE FOR IDENTIFYING RECEIVERS OF A MESSAGE

CROSS REFERENCE TO RELATED APPLICATION

This application is a 35 U.S.C. §371 national stage application of PCT International Application No. PCT/SE2011/051457, filed on 30 Nov. 2011, the disclosure of which is incorporated by reference herein in its entirety. The above-referenced PCT International Application was published in the English language as International Publication No. WO 2013/081513 A1 on 6 Jun. 2013.

TECHNICAL FIELD

The present disclosure relates to a method and an apparatus in a communication node for identifying receivers of a message from a user of a user device. More specifically, the present disclosure relates to methods and apparatuses in a communication node of a communication network for creating a group of contacts to receive a message from a user of a user device.

BACKGROUND

Online social networking applications, such as Facebook and Twitter are very much used in modern user devices for communication among users. With user devices in communication networks are meant e.g. mobile devices, such as smart phones. One of the main reasons for the popularity of these applications is that they enrich communication among users of the applications, for example allow users to easily share information.

As a user of a communication service, it is of interest to share content with other users of that service. For example, a user may want to invite people to participate in a planned activity, or he/she may want to share information regarding a certain topic with people in his/her vast, or narrower, circle of acquaintances. This may be achieved by sending messages to contacts stored in a contact repository, such as an address book of the user's user device, or in a contact list of a mobile application, such as Facebook. If the user sends a message, such as an invitation or information to everyone in his/her contact list, some of his/her contacts will receive a message that is not at all relevant and of interest to them. Consequently, the user will need to specify a limited selection of contacts for receiving the message, before sending the message. This may be accomplished by manually picking out certain contacts from a contact repository, such as the address book of the user's user device or the contact list of the user's Facebook account. This may be a rather tedious and time-consuming procedure. As an example, the average number of contacts in Facebook for one user is 130, as of 2011. Further, the user may have contacts in different types of communication applications, such as the contact list of the user device, the Facebook account, the email account(s) etc. It is thus a problem that it is a tedious and time-consuming procedure to manually identifying receivers of a message, such as an invitation or information.

SUMMARY

It is an object of the invention to address at least some of the problems and issues outlined above. More specifically, it is an object of the invention to make it possible for a user in a communication network to automatically create groups of contacts for receiving a message dynamically, depending on the contacts' interest to receive such a message. It is possible to achieve these objects and others by using a method and an apparatus as defined in the attached independent claims.

According to one aspect, a method in a communication node is provided for creating a group of contacts to receive a message from a user of a user device. The method comprises: receiving a tag indicating conditions for said message, obtaining characteristics of primary contacts of the user, selecting primary contacts for receiving said message by matching the conditions of the tag with the characteristics of the primary contacts, and selecting primary contacts having characteristics that match the conditions of the tag. Lastly, a group comprising the selected primary contacts is initiated. Further, the message may be sent to the initiated group of primary contacts.

The communication node may be a user device, or a server in the communication network. I.e. the method may be implemented either in a user device or in a server in the network. Also, it may be possible that the method is implemented such that some steps are performed in the user device and some in the server. Alternatively, in some embodiments, the method may be implemented such that some steps are performed by a first user device and some steps by a second user device. Even further user devices and/or servers may be involved when implementing the invention. A communication network may be any kind of mobile communication network, e.g. for data communication. The communication network may also incorporate a data communication network connected to the mobile comm. network, such as the Internet.

By such a method it is possible to dynamically set up a group of contacts for receiving a message, which contacts have characteristics similar to the conditions specified in the tag. Since the tag, which may be part of a group creating request, normally originates from the user of the user device, the user has the possibility to set the type of conditions that he/she would like the group to be based upon, and eventually only reach his contacts which characteristics match the conditions of the tag. Consequently, the user can dynamically select receivers of a message based on the characteristics of the users. Also, the primary contacts will only receive messages from the user, which messages have a condition, such as topic, that matches the primary contact's characteristics.

According to another aspect, an arrangement in a communication node for creating a group of contacts to receive a message from a user of a user device is provided. The arrangement comprises a receiving unit for receiving a tag indicating conditions for said message and an obtaining unit for obtaining characteristics of primary contacts of the user. The arrangement also comprises a selecting unit for selecting primary contacts for receiving said message by matching the conditions of the tag with the characteristics of the primary contacts and selecting primary contacts having characteristics that match the conditions of the tag, and an initiating unit for initiating said group comprising the selected primary contacts.

The above method and apparatus may be configured and implemented according to different optional embodiments. In one possible embodiment, the method caters for the possibility of the group comprising also secondary contacts of the user. The method comprises generating distribution keys for the selected primary contacts, which distribution keys comprise requirements for the selected primary contacts for redistributing the message to secondary contacts, and sending the message to the selected primary contacts, comprising the generated distribution keys of the selected primary contacts.

Secondary contacts are defined as the primary contacts' contacts, e.g. persons in contact lists of the primary contacts.

By generating a distribution key, which distribution key has requirements to be fulfilled for a selected primary contact to redistribute the message to the secondary contacts, it will be possible to control the redistribution of the message from the selected primary contacts to the secondary contacts. Thereby, it is possible for a user to distribute a message outside the people of his regular contacts to reach secondary contacts. At the same time, it is possible for the user to control and limit the number of his contacts that are allowed to distribute the message to its secondary contacts, and also the number of secondary contacts that can receive a message. Consequently, a controlled viral distribution of messages, such as invitations to join a shared network space has been achieved.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

The present disclosure is engaged with the need for a user in a communication network to be able to automatically create groups of contacts for receiving a message dynamically, depending on the contacts' interest to receive such a message. Further, there is a need to create group of contacts for receiving a message dynamically depending on the sender's interest in the individual contacts receiving such a message. The message may contain information, such as an invitation to join a social network, or a collaboration service, such as a shared network space.

Briefly described, a solution is provided for enabling dynamically creating groups of contacts for receiving a message in a communication network. This is accomplished by a method comparing a condition of a tag of a message with characteristics of primary contacts of a user that wants to send the message. The condition of the tag describes something that characterizes the message, such as the topic of the message, and/or a current location for which the message is valid. Similarly, the characteristics of a primary contact may describe the interests of the contact or a current location of the contact. The conditions of the tag and the characteristics of the primary contacts are matched, and for the primary contacts for which a match is found a group is initiated that will receive the message.

The message may be an invitation to join a social network.

By the term "primary contacts" is meant persons of the communication network that the user that initiated the message has an address to I.e. that the user can reach directly via the communication network, without having to e.g. pass by another person. In other words, primary contacts are the first degree contacts of the user that initiated the message. By "a tag" is meant one or more tags.

According to an embodiment, distribution keys may be generated for the primary contacts that had a match. The distribution keys set requirements that need to be fulfilled for a matching primary contact to be allowed to redistribute the invitation to its contacts, called secondary contacts. Thereby, the number of contacts that can receive the message can be limited, but at the same time more people than only primary contacts can be reached.

The distribution key may use social strength as a requirement for redistribution. The concept of social strength is described in patent application US2011/0213785 from the same applicant. This document describes a method of providing a ranked list of contacts based on social strength and contextual data, by: receiving a ranked list of contacts depending on social strength, defined as a number of communication contacts taken between a user and a contact using different communication services; receiving a request for said list including contextual data; calculating a rank depending on social strength and contextual data, and transmitting the ranked list towards the user. Although, the concept of using social strength as a requirement for limiting redistribution of invitations from a user's primary contacts to the user's secondary contacts, i.e. the contact of the user's primary contacts, is not described.

Some possible embodiments and examples for putting the solution into practice will now be described and illustrated by the following figures.

Figure 1:
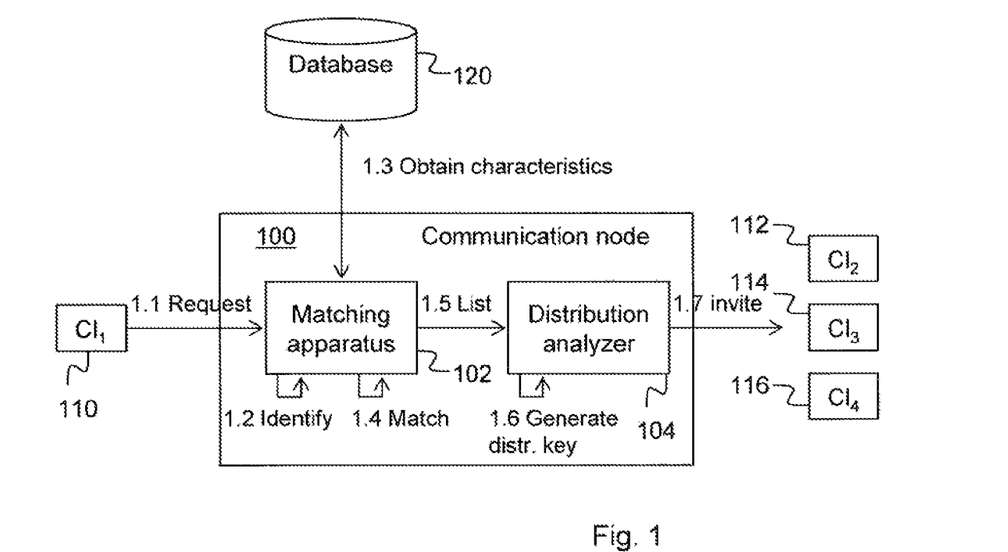
FIG. 1 is a communication scenario illustrating a method for creating a group of contacts for receiving a message according to an embodiment.

FIG. 1 describes a communication scenario according to an embodiment. A communication node 100 in a communication network is described, which node creates a group of contacts for receiving an invitation and sends the invitation to a number of primary contacts 112, 114, 116 of a user. The communication node may reside in the user device 110 of the user, or in a node in the communication network, such as in a server. The communication scenario starts with the user of the user device 110 sending a request 1.1 to the communication node 100 to invite contacts of the user to join a social network or shared network space. The request comprises a tag indicating conditions of the invitation. The conditions may comprise keywords of the invitation or location of the user etc., for example a topic of the message. The conditions may be set by the user manually, or may be defined by the user device based on some predefined criteria, such as based on the user's current location or based on information obtained from a calendar of the user device.

The request is received in a matching apparatus 102 of the communication node. The matching apparatus 102 then identifies 1.2 contacts in a list of contacts of the user, called primary contacts. The list of contacts may be a contact list in the user device 110 and/or a contact list in a network application, such as Facebook. Thereafter, the matching apparatus 102 obtains 1.3 characteristics of the primary contacts from a database 120. The database contains characteristics of the contacts stored in advance, by e.g. each contact specifying its own characteristics and storing them in the database. The characteristics may be e.g. interests of the contacts. The characteristics may also comprise location of each contact. The location is then received by the system, based on any kind of known mobile positioning method, such as GPS based positioning, triangulation etc. The database 120 normally resides in the communication network, e.g. in a server of the communication network. Alternatively, the database may be replicated to all user devices having this service. The database may be called a keyword repository.

After obtaining the characteristics, the matching apparatus 102 selects primary users to receive the invitation by matching 1.4 the conditions of the tag with the characteristics of the primary contacts and selecting primary contacts having characteristics that match the conditions of the tag. Thereafter, the matching apparatus presents 1.5 a list or group comprising the selected primary contacts. This list is distributed to another unit in the communication node 100 called a distribution analyzer 104.

The distribution analyzer 104 generates 1.6 distribution keys for the selected primary contacts. The distribution keys comprise requirements for the selected primary contacts for distributing the message to its contacts, herein called secondary contacts, since they are secondary contacts of the user from which the invitation originated. I.e. the secondary contacts are contacts in contact lists of each primary contact, for example in a user device of the primary contacts or in a contact list in a network application, such as Facebook. The distribution keys may be set based on social strength between the user and each of its primary contacts. The concept of social strength as described in patent application US2011/0213785, which, as mentioned, describes a user's communication habits with its contacts in a so called Aggregated Social Graph (ASG) may be used to calculate social strength between the user and its contacts. Social strength may be ranked e.g. based on the frequency of connections taken between a first contact that sent an invitation and a second contact receiving the invitation from the first contact, in this case the user and a primary contact in the communication network. The connections may be taken via any communication source in the communication network, i.e. social media, such as Facebook, via any mobile connection such as any messaging service or via a regular phone call. I.e. the more connections taken in a communication network between a first contact and a second contact, the higher the social strength. For being able to count connections taken, there is an initiation activity, where the users sign up and provide access credentials to its social networking and communication sources to authorize the distribution analyzer 104 to analyze interactions between the user and the primary contact for calculating social strength values.

The distribution keys define if each primary contact is allowed to redistribute the invitation to its secondary contacts and to how many (in percentage) of its contacts that the invitation can be distributed. The distribution key also defines a degree of propagation. This means in how many propagation steps away from the user, i.e. the original sender of the invitation, the invitation may be distributed at most i.e. 2 steps means that the invitation can be distributed to at most secondary contacts, and not the contacts of the secondary contacts. The method of propagating imitations to secondary contacts, third degree contacts (contact of secondary contacts) etc. will be described further in connection with FIG. 2.

The social distribution analyzer generates the distribution key by first checking if the user provides any constraints on the key propagation value such as degree of propagation. If a constraint is provided by the user, the distribution analyzer may take that value and modify it based on the social strength value for each primary contact. If no constraint is provided, a new distribution key is generated based on default values. The format of the distribution key may be a Boolean character and four numeric values. For example, a distribution key may be N0000 or Y0410. The first part of the code, i.e. the Boolean character describes if the contact is allowed to distribute the invitation or not. Y means having a permission to distribute; N means no permission to distribute. The second part of the code, i.e. the first two numbers, defines a degree of propagation, i.e. in how many steps the invitation can be distributed, e.g. 02 means distribution allowed to secondary contacts, 03 to third level contacts. The third part of the code, i.e. the last two numbers, defines percentage of distribution, i.e. percentage of contacts that the contact receiving the distribution key is allowed to distribute the invitation to. The selection based on distribution key is made based on social strength, as discussed. The third part of the code, defining degree of distribution may alternatively be an absolute value. For example, to be able to distribute an invitation, the contact receiving an invitation should have had at least X number of contacts the last month with the contact he received the invitation from. As an example, Y0410 means yes it is possible for the primary contact to distribute the invitation. It can be distributed up to the fourth level. The primary contact is allowed to distribute the invitation to the 10% of his secondary contacts with highest social strength. The last step means that the 10% with highest social strength of the secondary contacts where the tag condition matches the contact characteristic will receive the distributed invitation. Thereafter, the invitation is sent 1.7 to each selected primary contact 112, 114, 116 together with the distribution key.

Below is an algorithm for distribution key generation.

```
Case1: Is the contacts message containing distribution_key?
    On yes:
        Parse the distribution_key
            get character as distribution_credential
            get next two numbers as degree_of_propagation
            get last two numbers as percentage_of_distribution
        if distribution_credential = "N"
                new_distribution_credential = N0000;
        if distribution_credential ="Y"
            degree_of_propagation = degree_of_propagation – 1;
            percentage_of_distribution = degree_of_propagation*10
            if degree_of_propagation>0
            new_distribution_key  =  "Y"  +  "two number form
of degree_of_propagation" + "two number form of
percentage_of_distribution"
        On No:
            new_distribution_key=Y0440
    Case2: Participants with less social strength (not covered by the
percentage of distribution range)
        new_distribution_key_Is=N0000;
```

As could be seen from the algorithm, the degree of propagation defines how many more levels that may at most receive an invitation. In the example of the algorithm, the degree of propagation is lowered with 1 for each contact level away from the user, i.e. the original sender of the invitation. Also, the percentage of distribution is lowered with 10% for each contact level away from the user.

The described procedure will now be described based on an example, with references to the procedure steps in FIG. 1. A user called John wants to create a group of contacts regarding his interest "ice skating". John then initiates an invitation with a request 1.1 for creating a group of contacts, comprising a tag defined as "ice skating". The message is received at the communication node 100. The communication node then identifies 1.2 John's contacts, i.e. persons that John has contact data to, for example contacts in the contact list of John's user device, and/or contacts in John's Facebook account, and obtains 1.3 characteristics of these contacts from the database 120. The node then checks which of the contacts' characteristics that contain the condition of the tag, i.e. "ice-skating". For all contacts where such a match 1.4 is received, a group or list 1.5 of matching contacts is created comprising all contacts with the characteristic "ice-skating". John may then use this dynamically created group to send an invitation 1.7 to the group to e.g. join a social network John is about to set up regarding ice skating, or to send a message regarding some ice-skating topic to the persons in the dynamically created group. Thereby, it is possible for John to easily reach only those persons of his contacts that are interested in ice-skating.

Further, John may want to invite people that are not in his contact lists, but that are in contact lists of his primary contacts, i.e. the secondary contacts, to be able to reach more people. Although, he would like to limit the amount of secondary contacts getting an invitation. For that purpose the communication node 100 generates 1.6 a distribution key for each of John's primary contacts which characteristics matched the conditions of the tag, i.e. the contacts that are interested in ice-skating. The distribution key contains requirements that need to be fulfilled for his primary contacts that are interested in ice-skating to be allowed to redistribute the invitation. The distribution key may be set by John manually, or it may be set by the communication node.

John defines that he wants to contact secondary contacts but not third level contacts and he wants 50% of his primary contacts to be able to distribute the invitation. He then sets the distribution key to Y0250, which means Yes, it is allowed to redistribute the invitation but only to secondary contacts and only the 50% of the selected primary contacts with highest social strength are allowed to redistribute the invitation.

Figure 2:
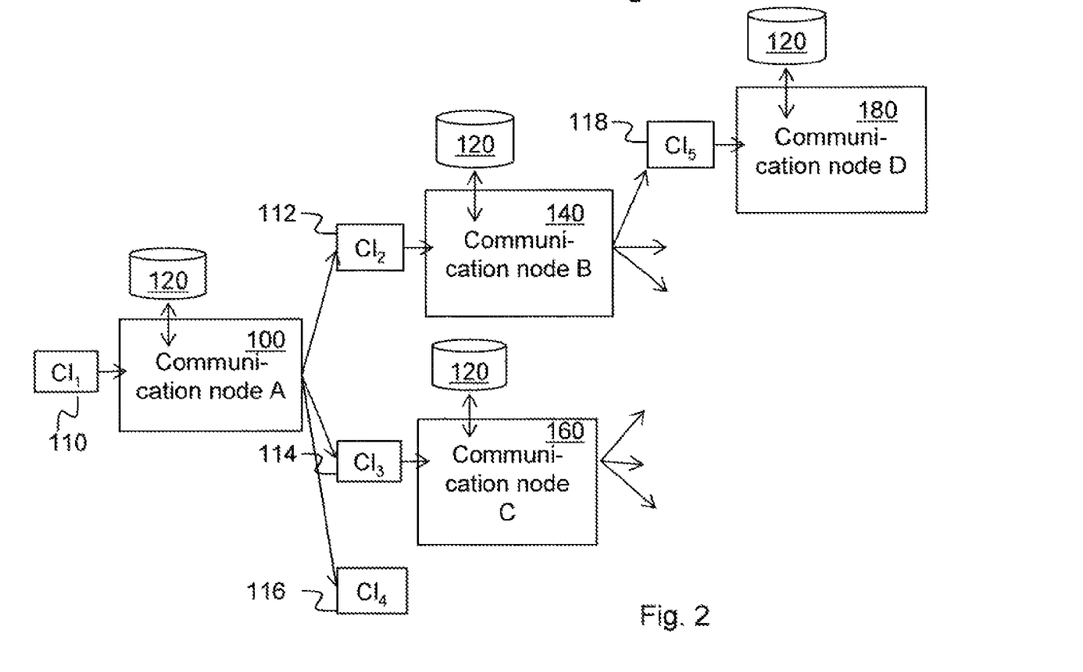
FIG. 2 is another communication scenario illustrating a method for creating a group of contacts for receiving a message according to another embodiment.

FIG. 2 describes an embodiment where the propagation of an invitation in the network is shown. FIG. 2 comprises four communication nodes, A-D, 100, 140, 160, 180, each communication node having an arrangement as the communication node 100 described in FIG. 1. Communication node A 100 serves the user (i.e. originator of the invitation), Communication node B 140 serves selected primary contact $Cl_2$ 112, communication node C 160 serves selected primary contact $Cl_3$ 114 and communication node D 180 serves a selected secondary contact $Cl_5$ 118. In the figure, the communication node A 100 has produced an invite 1.7 that is sent to the selected primary contacts $Cl_2$ 112, $Cl_3$ 114, $Cl_4$ 116 as described in FIG. 1. The invitation comprises distribution keys for each selected primary contact. Each of the selected primary contacts analyzes its received distribution key to check whether it is allowed to distribute the invitation to its contacts. If primary contact $Cl_2$ 112 is allowed to distribute the invitation, the invitation is sent as a request 1.1 to communication node B 140. For Communication node B identifies secondary contacts of the selected primary contact $Cl_2$, obtains characteristics of the secondary contacts; matches the conditions of the tag with the characteristics of the secondary contacts and selects secondary contacts having characteristics that match the conditions of the tag, in the same way as described in FIG. 1. Further, distribution keys are generated in the distribution analyzer of communication node B 140 for the contacts of $Cl_2$, i.e. secondary contacts of the user $Cl_1$, exemplified by the contact $Cl_5$ 118. The distribution keys may be generated based on the received distribution keys from communication node A and modified in the distribution analyzer of communication node B according to the previously described algorithm for distribution key generation. Thereafter, the invitation is distributed to the selected secondary contacts. The secondary contacts that are allowed to distribute the invitation will receive a distributing code starting with Y. The secondary contacts that are not allowed to distribute the invitation will receive a distributing code starting with N. If contact $Cl_5$ 118 receives a distribution code starting with Y, the same procedure of analyzing contacts of $Cl_5$ as for the contacts of $Cl_1$ and $Cl_2$ will take place. I.e. communication node D 180 identifies contacts of the selected secondary contact $Cl_5$, obtains characteristics of these contacts; matches the conditions of the tag with the characteristics of the contacts and selects contacts having characteristics that match the conditions of the tag, in the same way as described in FIG. 1. This procedure may be iterated for the users third level contacts, fourth level contacts etc. until at most the number defined in Degree of propagation in the distribution key. Although, it may end earlier if there are no matches in the matching apparatus. The communication nodes A-D may be different physical nodes or one and the same physical node. In case the communication nodes A-D are different physical nodes they may each be situated in the user device of a contact, e.g. communication node A 100 being situated in user device of $Cl_1$ 110, communication node B 140 being situated in user device of $Cl_2$ 112 etc. In the alternative when the communication nodes A-D are realized with one physical node, the node may be situated in the network, as a network server.

The invitation sent by the user 110 and distributed to a number of contacts may be an invitation to join a shared network space, which has been created by the user. The shared network space may be implemented using a product called Distributed Shared Memory (DSM) produced by the applicant. The DSM makes it possible to develop collaboration web applications. The user also has a goal-oriented social runtime deployed on his user device. The goal-oriented social runtime is used to create the shared network space by using the DSM service, the ASG service and the above described method for creating group of contacts. After receiving an invitation, the contact that has received the invitation may publish itself as a member in the shared network space. All contacts that choose to be members in the network has a direct relationship to each other, which means that each contact can communicate with all other contacts without any limitation from privacy perspective. Such a shared network space makes it possible to develop ad-hoc social networks with limited lifetime with people with the same interest.

Before using the application of inviting contacts and creating a shared network space, a user has to initiate the application on his user device. For this reason, the user creates an account to use the application. Thereby, access to a server having social graph services including social strength values between users is received. Also, the goal-oriented social runtime is downloaded to the user device. The server may be a server based on the aggregated social graph concept described in US2011/0213785. Also, the application asks the user to provide access credentials to the user's communication services such as Facebook, LinkedIn, Twitter, and to the UEs contact book, SMS, GPS location, call logs etc. This information is used for discovering contacts and propagating the invitation for joining a shared network space.

Figure 3:
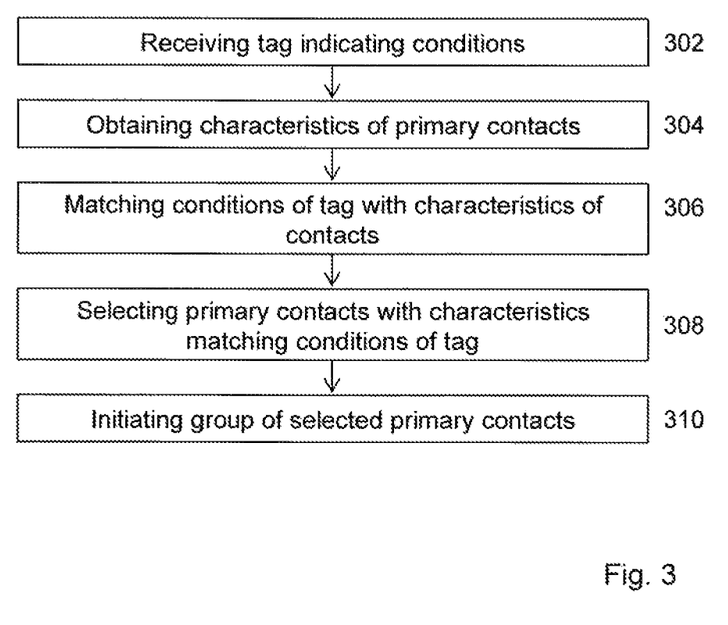
FIG. 3 is a flow chart illustrating a method for creating a group of contacts for receiving a message according to an embodiment.

FIG. 3 describes a method in a communication node for creating a group of contacts to receive a message from a user of a user device, according to an embodiment. The method comprises: receiving 302 a tag indicating conditions for said message and obtaining 304 characteristics of primary contacts of the user. The method further comprises selecting primary contacts for receiving said message by: matching 306 the conditions of the tag with the characteristics of the primary contacts and selecting 308 primary contacts having characteristics that match the conditions of the tag. At last the method comprises initiating 310 said group comprising the selected primary contacts. Thereafter, the message may be sent to the group of primary contacts.

The message may be an invitation to the initiated group of contacts to join a social network. This social network will comprise the group of selected contacts. Consequently, since the social network is built up dynamically by the user and its group of selected contacts, another way of looking at it would be that the invitation is, sent to the initiated group of contacts to form the social network. As a result, a dynamically created social network is created comprising persons with characteristics matching the conditions set by the user in the tag. Accordingly, persons with the same interest have easily and quickly been gathered into a group that has been created for this occasion.

The characteristics of the primary contacts may comprise interests of the primary contacts. The conditions of the tag may comprise a topic or topics of the message. Further, matching the conditions of the tag with the obtained characteristics of the primary contacts may comprise matching the interests of the primary contacts with the topic of the message to select the primary contacts which interests match the topic of the message.

According to an embodiment, the method may comprise sending the invitation to the initiated group of contacts over a bidirectional communication protocol, such as HTTP Web Socket. Also, the invitation may contain a link (URL) or configuration data to form a social network.

Figure 4:
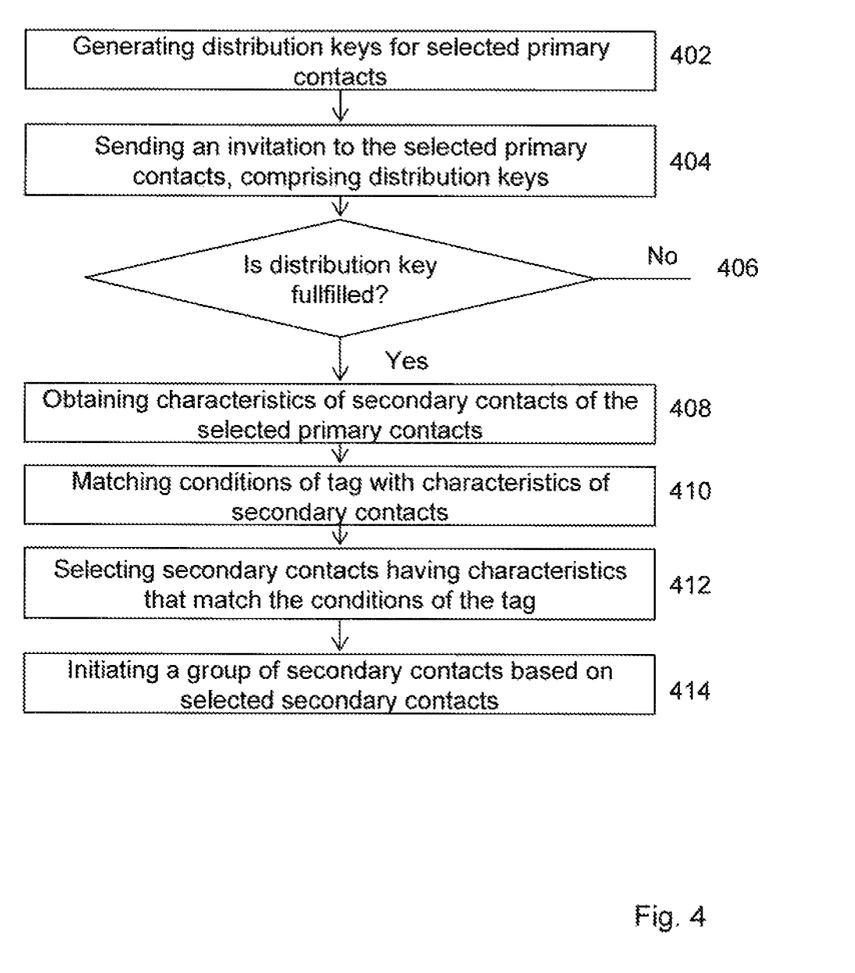
FIG. 4 is another flow chart illustrating a method for creating a group of secondary contacts for receiving a message according to an embodiment of the invention.

FIG. 4 describes another exemplary method of generating a group of contacts. The method caters for the possibility of the group comprising also secondary contacts of the user. The method comprises generating 402 distribution keys for the selected primary contacts, which distribution keys comprise requirements for the selected primary contacts for distributing, or with other words forwarding, the message to secondary contacts, wherein secondary contacts are contacts of the selected primary contacts; and sending 404 the message to the selected primary contacts, comprising the generated distribution keys of the selected primary contacts.

Further, the distribution key is checked for each selected primary contact to detect whether the primary contact is allowed to distribute, or forward, the message to its contacts. This detection may be performed by the user device of the primary contact, or by a communication node connected to the primary contact. If the distribution key allows 406 the primary contact to distribute the message, i.e. if the distribution key is fulfilled, the method proceeds by obtaining 408 characteristics of secondary contacts of the selected primary contacts and matching 410 the conditions of the tag with the characteristics of the secondary contacts. Further, secondary contacts are selected 412 that have characteristics matching the conditions of the tag, and a group of secondary contacts for receiving the message based on the selected secondary contacts are initiated 414. Alternatively, it may be possible to set constraints also for delivery of messages to primary contacts. For example, it may be possible to use the concept of distribution keys to select to distribute a message, e.g. an invitation, to only e.g. 50% of the primary contacts for which a match were received. The selection may then be made using social strength between the user and its primary contacts.

According to an embodiment, to generate 402 distribution keys for the selected primary contacts comprises: obtaining a social strength value of the selected primary contacts, the social strength value indicating a social affinity for the respective selected primary contact to the user, and generating the distribution keys based on the obtained social strength values. "Social strength" is a measure of how strong social connection or affinity the user has with a contact. Social strength may be measured as the frequency of interactions taken in a communication network between a user and a contact. By generating distribution keys based on social strength values, it is possible to prioritize a contact with high social affinity to a sender of the message before a contact with lower social affinity to the sender. For example, it is possible to give a primary contact with high social affinity to the sender a right to distribute the message to its contacts whereas a contact with low social affinity to the sender has no or lower rights to distribute the message to its contacts. Thereby, it is more likely that the receiver of the message, e.g. a secondary contact, has an interest in the message and that the original sender of the message and the secondary contact has a social relationship. This has proven to be a good way of lowering the amount of people receiving a message but still reaching lots of persons having an interest in the message.

According to an embodiment, the method further comprises obtaining a current location of the selected primary contacts and a current location of the user, and limiting the number of selected primary contacts based on the obtained current locations of the selected contacts relative to the obtained current location of the user. By limiting the number of selected primary contacts to receive the message based on locations of the user and the selected contacts it is possible to prioritize a contact that is situated close to a sender of the message before a contact that is situated more far away from the sender than the closely situated contact. For example, it is possible send the message only to the contacts being situated within a certain distance from the sender or to send the message to the 50% of the contacts that are situated closest to the sender. Thereby, it is more likely that the receiver of the message has an interest in the message.

According to another embodiment the distribution keys each has at least one of the following distribution codes: a first code for defining if distribution is allowed, a second code for defining a degree of propagation, and a third code for defining a degree of distribution. The degree of propagation defined in the second code defines in how many steps redistribution is allowed. For example, if redistribution is allowed from the user to the user's contacts' contacts, the degree of propagation is 3. The degree of distribution defined in the third code defines how many, e.g. in percentage, of the contacts or contacts' contacts (etc.) that are allowed to redistribute the message. The distribution key is normally set such that the degree of distribution is lowered the higher the degree of propagation, i.e. the more steps away from the primary contact the contacts for which the distribution key is valid are situated, the lower the degree of distribution. By defining the distribution key with any or all of these codes makes it possible to lower the amount of people receiving a message but still reaching lots of persons having an interest in the message.

According to an embodiment, the steps of: generating 402 distribution keys for the selected primary contacts, sending 404 the message to the selected primary contacts, comprising the generated distribution keys of the selected contacts, as described above, and, if the requirements of the received distribution key are fulfilled by a selected contact: obtaining 408 characteristics of secondary contacts of the selected contacts; matching 410 the conditions of the tag with the characteristics of the secondary contacts; selecting 412 secondary contacts having characteristics that match the conditions of the tag; initiating 414 a group of secondary contacts for receiving the message based on the selected secondary contacts, are iterated for as long as a distribution key is fulfilled and a match is found.

By this embodiment it is described that to select contacts to receive a message are based on a matching procedure, irrespective on which propagation level the contact is with respect to the originator of the message. Further, generated distribution keys are used for deciding which of the contact's contacts that will receive the message, irrespective of propagation level. Further, it is described that these matching and distribution key generating procedures are reiterated until the distribution key is fulfilled and a match is found. According to an embodiment, the reiteration procedure may proceed at most until the number of propagation levels decided in the degree of propagation key of the distribution key. Although, it may end earlier if there are no matches in the matching procedure or if the degree of distribution will be set to 0.

Figure 5:
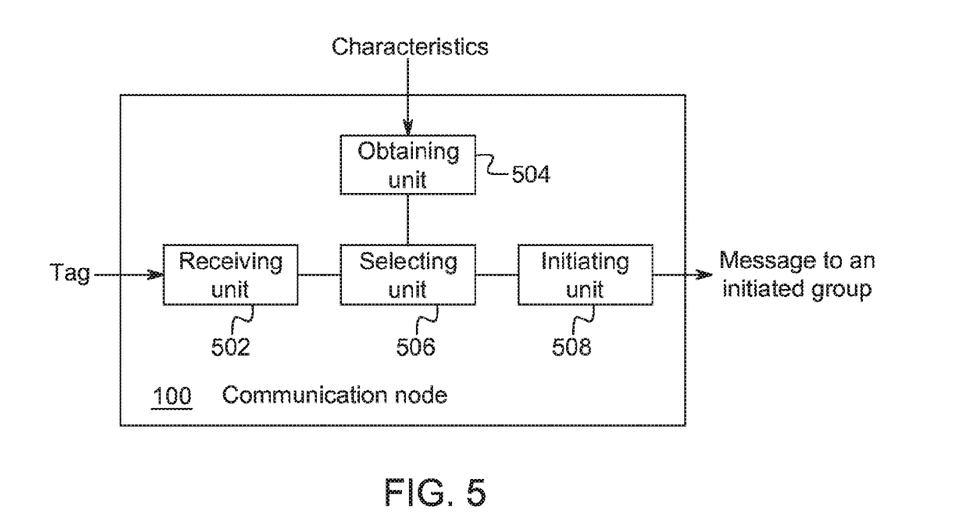
FIG. 5 is a schematic block diagram illustrating an arrangement in a communication node according to an embodiment.

FIG. 5 describes an arrangement in a communication node 100 for creating a group of contacts to receive a message from a user of a user device. The arrangement comprises a receiving unit 502 for receiving a tag from a user of a user device, the tag indicating conditions for said message. The tag may be received together with said message. The arrangement further comprises an obtaining unit 504 for obtaining characteristics of primary contacts of the user. The characteristics may be obtained from a database outside the communication node 100 connected to the communication node via the obtaining unit 504. The arrangement further comprises a selecting unit 506 connected to the receiving unit 502 and the obtaining unit 504. The selecting unit 506 is arranged for selecting primary contacts for receiving said message by matching the conditions of the tag with the characteristics of the primary contacts and selecting primary contacts having characteristics that match the conditions of the tag. Further, the arrangement comprises an initiating unit 508 connected to the selecting unit for initiating said group comprising the selected primary contacts. The initiating unit may also be arranged for sending the message to the initiated group.

Figure 6:
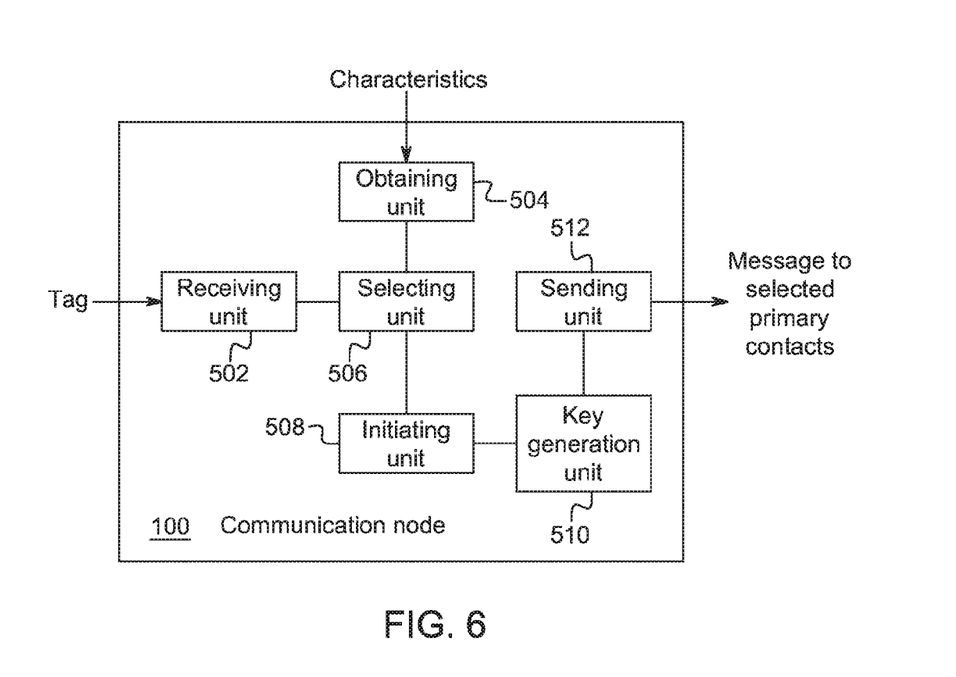
FIG. 6 is another schematic block diagram illustrating an arrangement in a communication node according to an embodiment.

FIG. 6 describes another arrangement in a communication node 100. The arrangement differs from the arrangement of FIG. 5 in that in addition to the units presented in FIG. 5 it has a key generation unit 510 and a sending unit 512. The key generation unit 510, which is connected to the initiating unit 508, is arranged for generating distribution keys for the selected primary contacts, which distribution keys comprise requirements for the selected primary contacts for redistributing the message to secondary contacts, being contacts of the selected primary contacts. The sending unit 512, which is connected to the key generation unit 510, is arranged for sending the message to the selected primary contacts, comprising the generated distribution keys of the selected primary contacts. The arrangement may be arranged in either a server or in a user device.

According to an embodiment, the key generation unit 510 may further be arranged for obtaining a social strength value of the selected primary contacts, the social strength value indicating a social affinity for the respective selected primary contact to the user, and for generating the distribution keys based on the obtained social strength values.

According to another embodiment, the selecting unit 506 is arranged for obtaining a current location of the selected contacts and a current location of the user, and limiting the number of selected primary contacts based on the obtained current locations of the selected contacts relative to the obtained current location of the user.

According to another embodiment, the distribution keys each has at least one of the following distribution codes: a first code for defining if distribution is allowed, a second code for defining a degree of propagation, and a third code for defining a degree of distribution.

According to an embodiment, the arrangement of FIG. 5 or 6 is arranged in a user device, i.e. the communication node 100 is a user device, such as a smart phone. In this embodiment, each user device using the invention is equipped with such an arrangement.

According to another embodiment, the arrangement of FIG. 5 or 6 is arranged in a server in the communication network.

According to another embodiment, the communication node has a processor for reading computer readable code means. Further, the arrangement is a computer program product, comprising computer readable code means, which when run by the processor of the communication node causes the node to perform any of the methods described.

Figure 7:
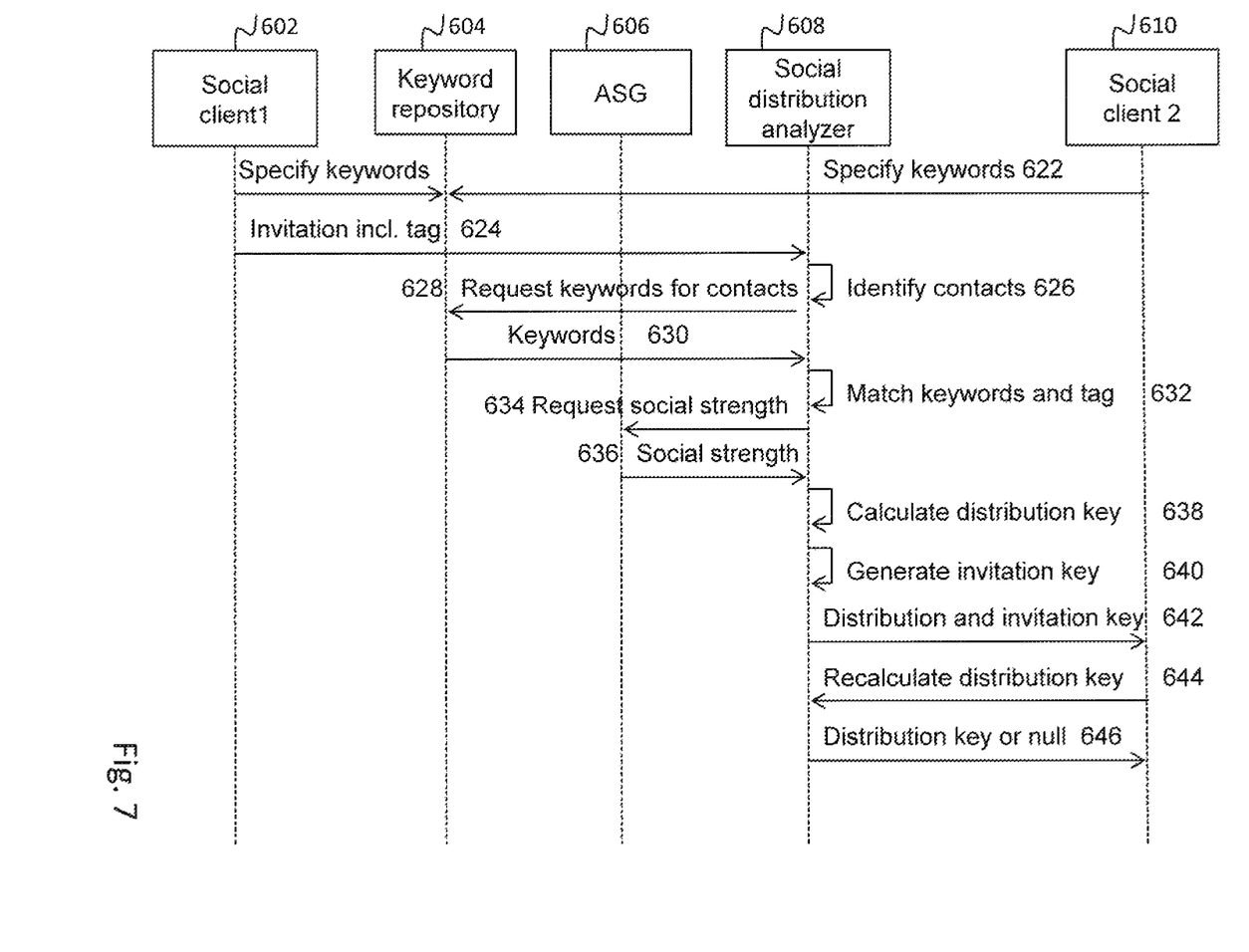
FIG. 7 is a signaling diagram illustrating an example of a procedure when the arrangement is in use according to further possible embodiments.

FIG. 7 describes a signaling diagram of an arrangement according to an embodiment, when the arrangement is in use. In the figure the following signaling nodes are shown: a first social client 602, a server called a keyword repository 604, an Aggregated Social Graph (ASG) unit 606, a social distribution analyzer (SDA) 608 and a second social client 610. The signaling diagram describes the procedure of initiating a group of contacts for receiving an invitation. The social clients 602 and 610 may be software in the user device of a first and a second user, respectively, arranged for handling interaction with the user. Correct? The second social client represents a number of second social clients that may receive an invitation from the first social client. The keyword repository 604 is arranged for storing keywords of users of the service in the communication network. The keyword repository is in a first centralized solution arranged in a server in the network, and in a second distributed solution it may be arranged distributed to the user devices. The ASG 606 comprises software for obtaining input data and calculating social strength values between users in the communication network based on social interactions between users in the communication network. The ASG is in the first centralized solution arranged in a server in the network and in the second distributed solution arranged in the user devices of the network. The SDA 608 is arranged for selecting matching contacts to create a list of contacts for receiving an invitation and for calculating the distribution keys. The SDA is in the centralized solution arranged in a server of the network and in the distributed solution arranged in the user devices of the network.

Before a procedure of initiating a list of contacts for receiving an invitation starts, the first user and the number of second users have specified their keywords, or characteristics, via the first social client 602 and the number of second social clients 610. The keywords may define the interests of each of the users. The keywords are sent 622 to the keyword repository 604 were they are stored for future use in the initiation procedure. Thereafter, the initiation procedure starts by the first social client 602 sending 624 an invitation to e.g. join a shared network space to the SDA 608. The SDA 608 identifies contacts 626 of the user of the first social client 602, requests keywords 628 for the identified contacts from the keyword repository 604 and receives the requested keywords 630. Further, the SDA matches 632 keywords with tags and based on the matching selects contacts for receiving the invitation to initiate a list of contacts based on the selected contacts. Further, the SDA requests 634 and receives 636 social strength values from the ASG 606, the social strength values indicating social strength between the first user and each of the second users. Based on the received social strength, the SDA 608 calculates 638 distribution keys indicating to which extent each of the second users are allowed to redistribute the invitation. The SDA may also generate 640 an invitation key which is an authorization key to be used by the second user when responding to the invitation. Thereafter, the SDA sends 642 the distribution and invitation key together with the invitation to the second user and the second social client. Thereafter, the distribution key sent to the Social client 2 may be recalculated 644 to become a distribution key directed to the contacts of Social client 2. This recalculation step is set to indicate to which of its contacts, the contacts of Social client 2 are allowed to redistribute the invitation. Thereafter, the recalculated distribution key or a null value, if no redistribution is allowed, is sent 646 to Social client 2, for further distribution to the contacts of Social client 2.

While the solution has been described with reference to specific exemplary embodiments, the description is generally only intended to illustrate the inventive concept and should not be taken as limiting the scope of the solution. The solution is defined by the appended claims.

The invention claimed is:

1. A method in a communication node for creating a group of contacts to receive a message from a user of a user device, the method comprising:
    receiving a tag indicating conditions for said message, wherein the conditions comprise a topic of the message;
    obtaining characteristics of primary contacts of the user where the characteristics comprise interests of the primary contacts;
    selecting primary contacts for receiving said message by:
    matching the conditions of the tag with the characteristics of the primary contacts, wherein the matching comprises matching the interests with the topic; and
    selecting primary contacts having interests that match the topic;
    initiating said group comprising the selected primary contacts;
    generating distribution keys for the selected primary contacts, which distribution keys comprise requirements for the selected primary contacts for redistributing the message to secondary contacts, being contacts of the selected primary contacts;
    sending the message to the selected primary contacts, the message comprising the generated distribution keys of the selected primary contacts;
    checking the distribution key for each selected primary contact to detect whether the primary contact is allowed to redistribute the message to the secondary contacts;
    if the requirements of the received distribution key are fulfilled by the selected primary contact:
    obtaining characteristics of secondary contacts of the selected primary contacts;
    matching the conditions of the tag with the characteristics of the secondary contacts;
    selecting secondary contacts having characteristics that match the conditions of the tag; and
    initiating a group of secondary contacts for receiving the message based on the selected secondary contacts.

2. The method according to claim 1, wherein the message is an invitation to the initiated group of contacts to join a social network, or collaboration service such as a shared network space.

3. The method according to claim 1, wherein the generating comprises:
    obtaining a social strength value of the selected primary contacts, the social strength value indicating a social affinity for the respective selected primary contact to the user; and
    generating the distribution keys based on the obtained social strength values.

4. The method according to claim 1, further comprising:
    obtaining a current location of the selected primary contacts and a current location of the user; and
    limiting the number of the selected primary contacts based on the obtained current locations of the selected primary contacts relative to the obtained current location of the user.

5. The method according to claim 1, wherein the distribution keys each has at least one of the following distribution codes: a first code for defining if distribution is allowed, a second code for defining a degree of propagation, and a third code for defining a degree of distribution.

6. The method according to claim 1, wherein the steps are reiterated as long as any of the distribution keys are fulfilled and a match of the tag with the characteristics is found.

7. The method according to claim 6, wherein the generating and the sending are repeated up to a maximum number of iterations equal to said degree of propagation.

8. The method according to claim 1, wherein the method is performed in a user device.

9. The method according to claim 1, wherein the method is performed in a server of the communication network.

10. The method according to claim 2, further comprising sending the invitation to the initiated group of contacts over a bidirectional communication protocol comprising a HTTP Web Socket.

11. An arrangement in a communication node for creating a group of contacts to receive a message from a user of a user device, the arrangement comprising:
    a processor in the communication node, in communication with a memory, configured to:
    receive a tag indicating conditions for said message;
    obtain characteristics of primary contacts of the user;
    select primary contacts for receiving said message by matching the conditions of the tag with the characteristics of the primary contacts and selecting primary contacts having characteristics that match the conditions of the tag;
    initiate said group comprising the selected primary contacts;
    generate distribution keys for the selected primary contacts, which distribution keys comprise requirements for the selected primary contacts for redistributing the message to secondary contacts, being contacts of the selected primary contacts; and
    send the message to the selected primary contacts, the message comprising the generated distribution keys of the selected primary contacts;
    check the distribution key for each selected primary contact to detect whether the primary contact is allowed to redistribute the message to the secondary contacts;
    if the requirements of the received distribution key are fulfilled by the selected primary contact:
    obtain characteristics of secondary contacts of the selected primary contacts;
    match the conditions of the tag with the characteristics of the secondary contacts;
    select secondary contacts having characteristics that match the conditions of the tag; and
    initiate a group of secondary contacts for receiving the message based on the selected secondary contacts.

12. The arrangement according to claim 11, wherein the processor is further configured to obtain a social strength value of the selected primary contacts, the social strength value indicating a social affinity for the respective selected primary contact to the user, and generate the distribution keys based on the obtained social strength values.

13. The arrangement according to claim 11, wherein the processor is further configured to obtain a current location of the selected primary contacts and a current location of the user, and limit the number of the selected primary contacts based on the obtained current locations of the selected primary contacts relative to the obtained current location of the user.

14. The arrangement according to claim 11, wherein the distribution keys each has at least one of the following distribution codes: a first code for defining if distribution is allowed, a second code for defining a degree of propagation, and a third code for defining a degree of distribution.

15. The arrangement according to claim 11, wherein the arrangement is within a user device.

16. The arrangement according to claim 11, wherein the arrangement is within a server in the communication network.

17. A communication node comprising an arrangement for creating a group of contacts to receive a message from a user of the communication node, the arrangement comprising:
   a processor, in communication with a memory, configured to:
   receive a tag indicating conditions for said message;
   obtain characteristics of primary contacts of the user;
   select primary contacts for receiving said message by matching the conditions of the tag with the characteristics of the primary contacts and selecting primary contacts having characteristics that match the conditions of the tag;
   initiate said group comprising the selected primary contacts;
   generate distribution keys for the selected primary contacts, which distribution keys comprise requirements for the selected primary contacts for redistributing the message to secondary contacts, being contacts of the selected primary contacts; and
   send the message to the selected primary contacts, the message comprising the generated distribution keys of the selected primary contacts,
   check the distribution key for each selected primary contact to detect whether the primary contact is allowed to redistribute the message to the secondary contacts;
   if the requirements of the received distribution key are fulfilled by the selected primary contact:
   obtain characteristics of secondary contacts of the selected primary contacts;
   match the conditions of the tag with the characteristics of the secondary contacts;
   select secondary contacts having characteristics that match the conditions of the tag; and
   initiate a group of secondary contacts for receiving the message based on the selected secondary contacts.

* * * * *